(12) United States Patent
Ishii et al.

(10) Patent No.: US 7,398,129 B2
(45) Date of Patent: Jul. 8, 2008

(54) REPRESENTATION OF SHEET METAL PART MODELS

(75) Inventors: Masanobu Ishii, Laguna Hills, CA (US); Satoshi Sakai, Newport Beach, CA (US); Thanapandi Periasamy, Isehara (JP)

(73) Assignee: Amada Company, Limited, Kanagawa (JP)

( * ) Notice: Subject to any disclaimer, the term of this patent is extended or adjusted under 35 U.S.C. 154(b) by 586 days.

(21) Appl. No.: 10/959,153

(22) Filed: Oct. 7, 2004

(65) Prior Publication Data

US 2006/0079989 A1    Apr. 13, 2006

(51) Int. Cl.
G06F 19/00    (2006.01)
G06F 17/50    (2006.01)
(52) U.S. Cl. .................. 700/104; 706/55; 706/919
(58) Field of Classification Search ............ 706/45, 706/46, 55, 59, 919–923; 700/49, 104, 96–98
See application file for complete search history.

(56) References Cited

U.S. PATENT DOCUMENTS

| 4,912,644 | A | 3/1990 | Aoyama et al. |
|---|---|---|---|
| 4,998,206 | A | 3/1991 | Junes |
| 5,029,462 | A | 7/1991 | Wakahara et al. |
| 5,089,970 | A | 2/1992 | Lee et al. |
| 5,115,400 | A | 5/1992 | Watanabe et al. |
| 5,237,647 | A | 8/1993 | Roberts et al. |
| 5,278,983 | A | 1/1994 | Kawabe et al. |
| 5,307,282 | A | 4/1994 | Conradson et al. |
| 5,315,522 | A | 5/1994 | Kauffman et al. |
| 5,396,265 | A | 3/1995 | Ulrich et al. |
| 5,414,801 | A | 5/1995 | Smith et al. |
| 5,429,682 | A | 7/1995 | Harlow et al. |
| 5,434,791 | A | 7/1995 | Koko et al. |
| 5,453,933 | A | 9/1995 | Wright et al. |
| 5,537,519 | A | 7/1996 | Vossler et al. |
| 5,551,028 | A | 8/1996 | Voll et al. |
| 5,552,995 | A | 9/1996 | Sebastian |
| 5,587,914 | A | 12/1996 | Conradson et al. |

(Continued)

FOREIGN PATENT DOCUMENTS

EP    0187065    7/1986

(Continued)

OTHER PUBLICATIONS

Chu, Wesley W., et al., *Cooperative Query Answering Via Type Abstraction Hierarchy*, Computer Science Department Technical Report, CSD-900032, Department of Computer Science, University of California, Los Angeles, pp. 1-28 (Oct. 1990).

(Continued)

*Primary Examiner*—M. N. Von Buhr
(74) *Attorney, Agent, or Firm*—Greenblum & Bernstein, P.L.C.

(57) ABSTRACT

Data for a 3D sheet metal part model is stored in a file. The stored data includes features of the part and manufacturing information. When different manufacturing processes are used, different geometry can be created. The file can store multiple processes for manufacturing the part and the geometry associated with each process. Thus, when manufacturing the part, the user can view information for multiple stored processes because all of the information is stored together. In addition, both 2D and 3D data is stored for the part.

4 Claims, 6 Drawing Sheets

U.S. PATENT DOCUMENTS

| | | | |
|---|---|---|---|
| 5,712,654 A | 1/1998 | Kawashima et al. | |
| 5,822,206 A | 10/1998 | Sebastian et al. | |
| 5,822,207 A | 10/1998 | Hazama et al. | |
| 5,828,575 A | 10/1998 | Sakai | |
| 5,835,684 A | 11/1998 | Bourne et al. | |
| 5,847,953 A | 12/1998 | Sojoodi et al. | |
| 5,864,482 A | 1/1999 | Hazama et al. | |
| 5,886,897 A | 3/1999 | Hazama et al. | |
| 5,889,926 A | 3/1999 | Bourne et al. | |
| 5,966,310 A * | 10/1999 | Maeda et al. | 707/104.1 |
| 5,969,973 A | 10/1999 | Bourne et al. | |
| 5,971,589 A | 10/1999 | Hazama et al. | |
| 6,065,857 A | 5/2000 | Hazama et al. | |
| 6,185,476 B1 | 2/2001 | Sakai | |
| 6,212,441 B1 | 4/2001 | Hazama et al. | |
| 6,219,586 B1 | 4/2001 | Sakai | |
| 6,243,611 B1 | 6/2001 | Hazama et al. | |
| 6,256,596 B1 | 7/2001 | Leite et al. | |
| 6,292,707 B1 | 9/2001 | Hair et al. | |
| 6,327,514 B1 | 12/2001 | Hazama et al. | |
| 6,341,243 B1 | 1/2002 | Bourne et al. | |
| 6,411,862 B1 | 6/2002 | Hazama et al. | |
| 6,493,607 B1 | 12/2002 | Bourne et al. | |
| 6,507,767 B2 | 1/2003 | Bourne et al. | |
| 6,539,399 B1 * | 3/2003 | Hazama et al. | 707/104.1 |
| 6,542,937 B1 | 4/2003 | Kask et al. | |
| 6,687,557 B2 | 2/2004 | Ouchi | |
| 6,718,218 B1 | 4/2004 | Matheson | |
| 6,771,260 B1 | 8/2004 | Hazama et al. | |
| 6,879,872 B2 * | 4/2005 | Fukumura | 700/165 |
| 6,907,313 B2 * | 6/2005 | Matthews et al. | 700/182 |
| 6,922,602 B2 * | 7/2005 | Itoh | 700/118 |
| 7,031,893 B2 * | 4/2006 | Gupta et al. | 703/6 |
| 7,158,853 B2 * | 1/2007 | Sakai et al. | 700/182 |
| 7,266,419 B2 * | 9/2007 | Sakai et al. | 700/145 |
| 2001/0043236 A1 * | 11/2001 | Yamamoto | 345/781 |
| 2001/0055013 A1 * | 12/2001 | Fuki | 345/419 |
| 2002/0038163 A1 | 3/2002 | Hazama | |
| 2003/0085889 A1 | 5/2003 | Chin et al. | |
| 2003/0176994 A1 | 9/2003 | Spitz et al. | |
| 2003/0225553 A1 | 12/2003 | Brombolich | |
| 2004/0019042 A1 | 1/2004 | Bourne et al. | |
| 2004/0040009 A1 | 2/2004 | McCall et al. | |
| 2004/0177089 A1 * | 9/2004 | Love et al. | 707/103 R |
| 2004/0236447 A1 * | 11/2004 | Matsushita et al. | 700/98 |
| 2005/0171629 A1 | 8/2005 | Suh et al. | |
| 2005/0246160 A1 | 11/2005 | Zimmermann | |
| 2005/0278271 A1 * | 12/2005 | Anthony et al. | 706/919 |

FOREIGN PATENT DOCUMENTS

| | | |
|---|---|---|
| EP | 0290809 | 11/1988 |
| EP | 0361787 | 4/1990 |
| EP | 0402475 | 12/1990 |
| EP | 0419013 | 3/1991 |
| EP | 0485766 | 5/1992 |
| EP | 0397904 | 7/1994 |
| EP | 0664186 | 7/1995 |
| EP | 0768624 | 4/1997 |
| WO | 03/079123 | 9/2003 |
| WO | 2004/003798 | 1/2004 |

OTHER PUBLICATIONS

Chiang, Kuorong, *Automatic Generation of Type Abstraction Hierarchies For Cooperative Query Answering* ( A dissertation submitted as part of the requirements for the degree of Doctor of Philosophy in Computer Science), University of California, Los Angeles, pp. 1-98 (1995).

Mortenson, Michael E., *Geometric Modeling* (Title Page & Table of Contents), John Wiley & Sons, New York, (1988).

Foley, James D., et al., *The Systems Programming Series: Fundamentals of Interactive Computer Graphics*, (Title Page & Table of Contents), Addison-Wesley Publishing Co., Reading, Massachusetts (Mar. 1983).

Mantyla, Martti, *An Introduction To Solid Modeling* (Title Page & Table of Contents), Computer Science Press, Inc., Rockville, Maryland (1988).

Wesley, M.A., et al., "Fleshing Out Projections", *IBM J. Res. Develop.*, vol. 25, No. 6, pp. 934-954 (Nov. 1981).

Aomura, Shigeru, et al., "Creating Solid Model With Machine Drawings", *The Sixth Computational Mechanics Conference*, JSME, No. 930-71, pp. 497-498, Japan (1983).

Aomura, Shigeru, "Recent Trends And Future Prospect Of Research And Practical Use (Automatic Reconstruction of 3D Solid From Drawings)", JSME, No. 586-61, pp. 2180-2187, Japan (1995).

Open GL Architecture Review Board, *Open GL Reference Manual* (Title Page & Table of Contents), Release 1, Open GL Architecture Review Board, Addison-Wesley Publishing Co., Reading, Massachusetts (Jan. 1995).

Open GL Architecture Review Board, *Open GL Programming Guide* (Title Page & Table of Contents), Release 1, Open GL Architecture Review Board, Addison-Wesley Publishing Co., Reading, Massachusetts (Jun. 1995).

Criterion Software Ltd., *RenderWare, API Reference Manual* (Title Page & Table of Contents), V2.0, Criterion Software Ltd., United Kingdom (Oct. 1995).

Toyo Engineering Corp. (TEC), *2D-3D: UNKEI/Solid and UNKEI/Drawing Check & Projection/Reconstruction System*, Sales Brochure, Toyo Engineering Corp. (TEC), Tokyo, Japan (1993).

Naessens, Diederik, "Flexible Automation On Press Brakes" *American Machinist*, pp. 36-39 (Jun. 1994).

Wysong Literature, *The Perfect Forming Touch: New, PH PLUS Series, DNC Press Brakes*, Cat. PHP-1, Wysong & Miles Company, Greensboro, North Carolina (1993).

Bourne, David A., "Intelligent Manufacturing Workstations", *Knowledge-Based Automation of Processes*, Session at the 1992 ASME Winter Annual Meeting (Nov. 1992).

Bourne et al., "Using the Feature Exchange Language in the Next Generation Controller," CMU-RI-TR-90-19, *The Robotic Institute at Carnegie Mellon University*, Pittsburgh, PA (Aug. 1990).

Bourne et al., "Operational Feature Exchange Language," CMU-RI-TR-90-06, *The Robotic Institute at Carnegie Mellon University*, Pittsburgh, PA (Mar. 1990).

Nilsson, Nils J., "Problem-Solving Methods in Artificial Intelligence", McGraw-Hill Book Company, New York, Chapter 3, pp. 43-67 (1971).

Erion, "Generic Environment for LISP Based Experts", Center for Integrated Manufacturing Decision Systems, Carnegie Mellon University, pp. 113-136 (Mar. 1990).

Bourne, D., et al., "Feature Exchange Language Programmer's Guide", The Robotics Institute at Carnegie Mellon University, Pittsburgh, PA (Jan. 1994).

Radack et al., "The Integration of Inspection into the CIM Environment", Proceedings of the Systems Sciences 1990 Intl. Conference, pp. 455-462, IEEE.

Trappey et al., "A Data Representation scheme for Sheet Metal Parts: Expressing Manufacture and Features and Tolerance Requirements," *Journal of Manufacturing Systems*, vol. 14, No. 6, pp. 393-405, ISSN-0278-6125 (1995).

Wang, Cheng-Hua, "A Parallel Design System For Sheet Metal Parts", *Mechanical Engineering Report*, presented to the Mechanical Engineering Department, Carnegie Mellon University, Pittsburgh, Pennsylvania, pp. 1-31 (May 1992).

Wang, Cheng-Hua, et al., "Concurrent Product/Process Design With Multiple Representations Parts", IEEE, No. 1050-4729/93, pp. 298-304 (1993).

U.S. Amada, Ltd., *Amada Unfold: Manual for Autocad*, Table of Contents, Index & pp. 1-28, U.S. Amada, Ltd., Buena Park, California (Mar. 1994).

U.S. Amada, Ltd., *Amada Unfold: Manual for Cadkey*, Table of Contents, Index & pp. 1-18, U.S. Amada, Ltd., Buena Park, California (May 1994).

U.S. Amada, Ltd., *Amada Windows Unfold: Manual for Cadkey*, Table of Contents, pp. 1-35, & Index, U.S. Amada, Ltd., Buena Park California (Nov. 1995).

Amada Co., Ltd., *AMACOM: AP40 Literature*, Version 4, Amada Co., Ltd., Japan (Jul. 1996).

Amada Co., Ltd., *AMACOM: AP60 Literature*, Amada Co., Ltd., Japan (Jul. 1996).

Amada Co., Ltd., *AMACOM: AP200 Literature*, Amada Co., Ltd., Japan (Jul. 1996).

Amada Co., Ltd., *Bending Soft*, Literature on the AMACOM AP40, No. 9112-01, Amada Co., Ltd., Japan (Dec. 1991).

SPI GmbH, "Sheetmetal Desktop 3.01", Ahrensburg, Germany, published 1998, (http://www.spi.de/sheetmet/sml.htm).

SPI GmbH, "Sheetmetal Works 98Plus", Ahrensburg, Germany, published 1998, (http://www.spi.de/metalworks/smw_eng.htm.

SPI GmbH, "Sheetmetal AutoCAD 2000", Ahrensburg, Germany, published 1999, (http://www.spi.de/sheetmet/sma/htm).

IBM, "Method For Understanding Drawing Attributes For 3D Models", IBM Technical Disclosure Bulletin, vol. 37, No. 07, pp. 99-104 (Jul. 1994).

Tseng, Yuan-Jye, et al., "Recognizing Multiple Interpretations Of Interacting Machining Features", Computer-Aided Design, vol. 26, No. 9, pp. 667-688 (Sep. 1994).

Gu, P., et al., "Product Modelling Using STEP", Computer-Aided Design, vol. 27, No. 3, pp. 163-179 (Mar. 1995).

Papanikolopoulos, Nikolaos P., "FORS: A System For Flexible Design," *Conference Proceedings: 1990 IEEE International Conference On Systems, Man, And Cybernetics*, Los Angles, California, pp. 724-726, Nov. 4-7, 1990.

Patent Abstracts of Japan, vol. 018, No. 689 (P-1850), Dec. 26, 1994 & JP 06 274219 (Mutoh Ind. Ltd.).

Wang et al., "BendCad: a design system for concurrent multiple representations of parts," Journal of Intelligent Manufacturing, Chapman & Hall, London, GB, vol. 7, No. 2, 1996, pp. 133-144.

Liang et al., "Synthesis of consolidated data schema for engineering analysis from multiple STEP application protocols," Computer-Aided Design, Elsevier Publishers BV., Barking, GB, vol. 31, No. 7, Jun. 1999, pp. 429-447.

Wang et al., "Design and manufacturing of sheet-metal parts: using features to aid process planning and resolve manufacturability problems," Robotics & Computer-Integrated Manufacturing, Elsevier Science Publishers BV. Barking, GB, vol. 13, No. 3, Sep. 1997, pp. 281-294.

Suh et al., "Architecture and implementation of a shop-floor programming system for STEP-compliant CNC," Computer-Aided Design, Elsevier Publishers BV. Barking, GB, vol. 35, No. 12, Oct. 2003, pp. 1069-1083.

Hoffman et al., "CAD and the product master model," Computer-Aided Design, Elsevier Publishers BV. Barking, GB, vol. 30, No. 11, Sep. 1998, pp. 905-918.

Xu et al., "Striving for a total integration of CAD, CAPP, CAM and CNC," Robotics & Computer-Integrated Manufacturing, Elsevier Science Publishers BV. Barking, GB, vol. 20, No. 2, Apr. 2004, pp. 101-109.

Mervyn et al., "Developing distributed applications for integrated product and process design," Computer-Aided Design, Elsevier Publishers BV. Barking, GB, vol. 36, No. 8, Jul. 2004, pp. 679-689.

Newman, "Integrated manufacture for the 21st century," Metalworking Production Centaur Communications UK, vol. 148, No. 6, May 2004, pp. 13-14.

* cited by examiner

REPRESENTATION OF SHEET METAL PART MODELS

BACKGROUND OF THE INVENTION

1. Field of the Invention

The present invention relates to the field of computer-aided design (CAD) for sheet metal parts. More particularly, the present invention relates to capturing a designer's intentions in sheet metal part models.

2. Background Information

Even with the present improvements in product data management technologies, and the widespread use of computing systems and broadband communication networks, we do not see the same level of advancements in shop floor manufacturing processes. Paper process instruction sheets still convey processing instructions to shop floor operators. Thus, current CAM (computer-aided manufacturing) systems cannot determine processing (e.g., final NC data) that reflects the designer's intent from received CAD data. It would be desirable to store and display process attributes on a computer model at the appropriate locations so that detailed processing instructions are conveyed visually and more accurately to the shop floor operators.

Moreover, when designing a new 3D object on a computer-aided design (CAD) system, it would be useful to capture the designer's intentions (semantics). There is also a need for calculating multiple flat layout designs for a target part based upon different manufacturing processes, which may each modify the flat layout design, in addition to the target part's geometry.

SUMMARY OF THE INVENTION

In view of the foregoing, the present invention is directed to modeling 3D sheet metal parts.

In an embodiment of the present invention, a computer readable medium stores data associated with a 3D sheet metal part shape. The data includes feature data based upon user input, and manufacturing data. The feature data and the manufacturing data enable creation of a flat layout design.

In another embodiment, a computer readable medium stores data associated with models of a 3D sheet metal part shape. The data includes part data describing geometry data of each model, and attributes specific to each model. The model data also includes attribute data shared among a multiple models, the attributes including attribute types defining processes associated with the 3D sheet metal part shape. The model data further includes attribute parameters shared among the models, the attribute parameters providing data specific to each attribute type. The attributes include manufacturing attributes and geometrical entities belonging to the 3D sheet metal part shape.

In one aspect, the part data for a selected one of the models further includes face data describing each face of the selected model, and bend line data describing each bend line of the selected model. The part data also includes feature data describing sheet metal model edit features associated with the selected model, the features modifying the geometry data of the part. The part data may also include attributes specific to the selected model, the attributes comprising attribute types defining processes associated with the selected model. In another aspect, the attribute data also includes data associating each attribute with at least one of the models. The part data may include 2D geometry data and 3D geometry data.

An assembly file system may also be included. The assembly file system stores assembly data indicating how 3D sheet metal part components are assembled, and feature data indicating how 3D sheet metal part components are edited and/or matched at an assembly level. The assembly file system may also indicate how 3D sheet metal part shapes and at least one non-sheet metal shape are assembled.

In another embodiment of the present invention, a system is provided for constructing a 3D sheet metal part data file. The system includes a template selector that selects a template based upon a manufacturing process selected by a user when reviewing specification data. The system also includes a manufacturing database that stores templates that can be selected by the template selector. The templates enumerate parameters for multiple manufacturing processes. The system also includes a semantic (feature) generator and a memory. The semantic (feature) generator calculates template parameters and receives template parameters from the user. The memory stores the geometric feature data of the 3D sheet metal part and manufacturing data of the 3D part, the data being based upon the input parameters, calculated parameters, and specification data. Accordingly, different manufacturing data creates different geometric data.

The system may also include a semantic (feature) engine that creates geometry and topology information based upon the stored geometric feature data and manufacturing data. The geometry and topology data enable display of a final model representing a flat layout design necessary to manufacture the part described by the specification data.

The system may also include a manufacturing semantic (feature) archiver that processes user data reflecting a new feature added by a CAM user. The processing includes storing feature data, based upon the user data, in the memory to update the geometric feature data and the manufacturing data.

The system can also include a CAM document object model (DOM) generator that converts the geometric feature data and manufacturing data to a format for use with a CAM system. The data is converted in response to a CAM system requesting the feature data and manufacturing data.

In yet another embodiment, a method is provided for storing data associated with models of a 3D sheet metal part shape. The method includes storing part data comprising geometry data of each model, and attributes specific to each model. The method also includes storing attribute data shared among models. The attributes are attribute types defining processes associated with the 3D sheet metal part shape. The method further includes storing attribute parameters shared among the models, the attribute parameters providing data specific to each attribute type. The attributes include manufacturing attributes and geometrical entities belonging to the 3D sheet metal part shape.

Storing part data can for a selected one of the models can include storing face data describing each face of the selected model; and storing bend line data describing each bend line of the selected model. It can also include storing feature data comprising sheet metal model edit features associated with the selected model. The features modify the geometry data of the part. Storing part data can also include storing attributes specific to the selected model, the attributes being attribute types defining processes associated with the selected model. The attribute data can be data associating each attribute with at least one of the models. The part data can be 2D geometry data and 3D geometry data. In addition, a history of features can be stored, for example, in a hierarchical model. In this case, multiple histories of features can be stored.

In still another embodiment of the present invention, a method is provided for collaborating between networked work stations while designing and manufacturing a 3D sheet metal part. The method includes copying geometric feature data and manufacturing data to each work station. The method also includes providing a same version of a semantic (feature) engine at each work station. The semantic (feature) engine generates geometry and topology data at each work station based upon the geometric feature data and the manufacturing data stored at the work station so that a model of the 3D sheet metal part is displayed. The method further includes modifying the geometric feature data and/or manufacturing data at one of the work stations. In response to the modification, the method includes copying the modified data to each other work station so that new geometry and/or topology data is generated and an updated model of the 3D sheet metal part is displayed.

In another embodiment of the present invention, a system is provided for collaborating while designing and manufacturing a 3D sheet metal part. The system includes multiple work stations interconnected by a network. Each work station stores geometric feature data and manufacturing data and the same version of a semantic (feature) engine. The semantic (feature) engine generates geometry and topology data based upon the stored geometric feature data and the manufacturing data so that a model of the 3D sheet metal part is displayed at each work station. Modifying the geometric feature data and/or manufacturing data at one of the work stations causes copying of the modified data to each other work station so that new geometry and/or topology data is generated and an updated model of the 3D sheet metal part is displayed.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION

An object of the present invention is to represent sheet metal part shapes. Another object is to capture the designer's intentions.

According to an aspect of the present invention, a VPX (virtual product model extensible) model file system includes a product data structure of integrated CAD/CAM, process planning automation, and process simulation software systems. The file system represents integrated information of sheet metal products, including the manufacturing process adopted for manufacturing the products using sheet metal fabrication cells. The manufacturing cells can include a system of sheet metal fabrication machines, namely, numerical control turret punch machines, laser cutting machines, bending machines, welding machines, etc., as well as peripheral units that can be employed in the process, such as robots and other automated loading, unloading and handling systems. In other words, the file system contains the information of the product shape and the manufacturing process information (such as punching, laser cutting, bending, and assembling the manufactured parts using its underlying processes such as attaching and positioning the parts, welding and finishing) including the tools adopted in different processes.

The file system will carry the product and part shape information, including the process and tool information, between the software systems used for designing and engineering the product. The file system enables consideration of the different process alternatives in such a way that the product can be optimally manufactured with the processing information desired by the operators to meet the finish and precision standards expected for the product.

In an embodiment, the contents of the file are defined and represented as objects described in XML tags (or schema) and saved as XML files for easy reading by different software applications and transfer of data across networks.

Figure 1:
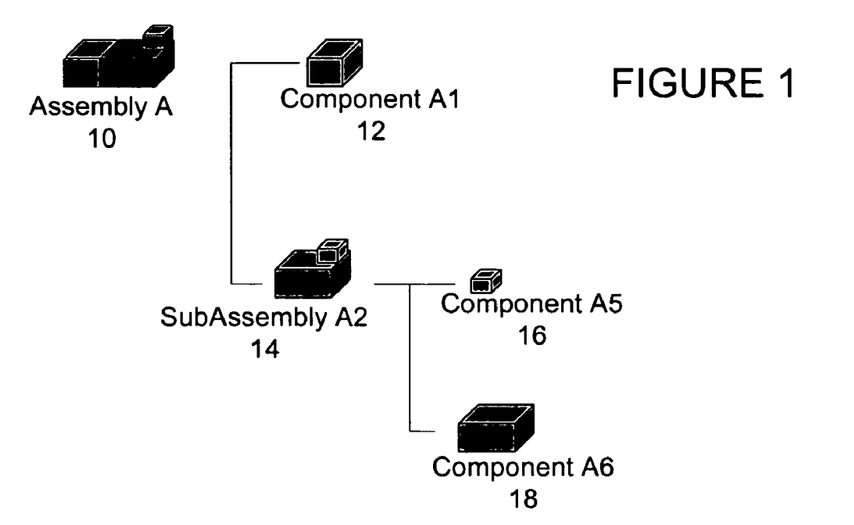
FIG. 1 illustrates a part assembly.
Figure 2:
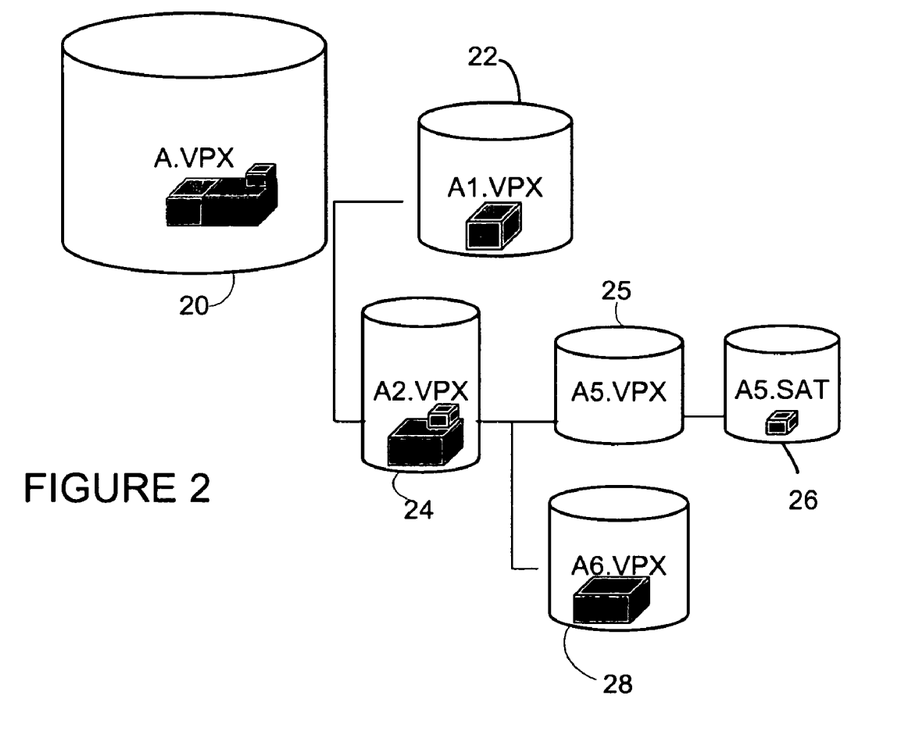
FIG. 2 illustrates a file system for representing the part assembly of FIG. 1, in accordance with an aspect of the present invention.

An assembly based model and corresponding VPX file system are illustrated in FIGS. 1 and 2, respectively. A final product 10 can be an assembly of one or more component parts 12 and/or sub assemblies 14, which may include additional component parts 16, 18. The component parts 12, 16, 18 can be sheet metal parts 12, 18 or non-sheet metal components 16.

The VPX representation of the final product 10 is an assembly based file system. In the file system, a main VPX assembly model file 20 stores a list of the component parts 12 and/or assembled parts 14, namely, sub assemblies, as well as assembly features (e.g., matching features) and features for editing the parts at the assembly level. In one embodiment, the main assembly VPX file 20 and the sub assembly VPX file 24 store the paths of the component parts, as well as the features defined at the main assembly level and subassembly level, respectively.

Each component sheet metal part 12, 18 is represented in a separate VPX file 22, 28 having base geometries and features, although some files can be without feature information. The individual part files 22, 28 store the geometry of the components, consisting of sketches representing the geometry of the faces along with topology information describing how the flanges are connected, and component related features defined at the part level. In one embodiment, the component sheet metal part VPX files 22, 28 store geometry of the part in both folded and unfolded form. This dual representation enables a module reading the component VPX file 22, 28 to obtain the unfolded geometry without relying upon the features in the component VPX file 22, 28 and the features in the assembly VPX file 20, which will affect the part geometry. Non sheet metal components 16 are described in a separate file 26, e.g., an SAT file. The SAT file describes the non-sheet metal part's geometry and geometric based features, and can be created by any 3D CAD program.

The VPX model is a data model that describes sophisticated manufacturing features. A feature is generally a data structure having a set of parameters to represent a shape or a process. When applied to the base geometry of the part, the features having the shape parameters modify the geometry of the part. Each of these sophisticated features is described in more detail below.

Sheet metal model edit features, e.g., setback, overlap, flange trimming, flange offsetting, radius corner trimming, relief holes, are some of the features having shape parameters. A few of these features, such as setback, overlap trimming, etc., have process parameters, such as type of weld, and weld parameters based on the type of weld.

The operations performed on the main assembly model 10, or sub assembly model 14 are represented as features that will be available in the main assembly VPX file 20 or sub assembly VPX file 24. Operations such as matching operations during assembly, and edit operations would also fall in this category.

As noted above, a sheet metal part will be internally represented by a set of shape features and process features available in the VPX file system. The contents of the files are defined so that a model constructed from the file can be represented and interpreted in terms of features. Therefore the model is feature descriptive. When the shape and process information is available in the form of features, a system reading the file can adopt a feature interpretation engine (also referred to as a semantic (feature) engine and construct a model that can be more intuitively edited by the user to prepare his desired design and manufacturing data.

Figure 3:
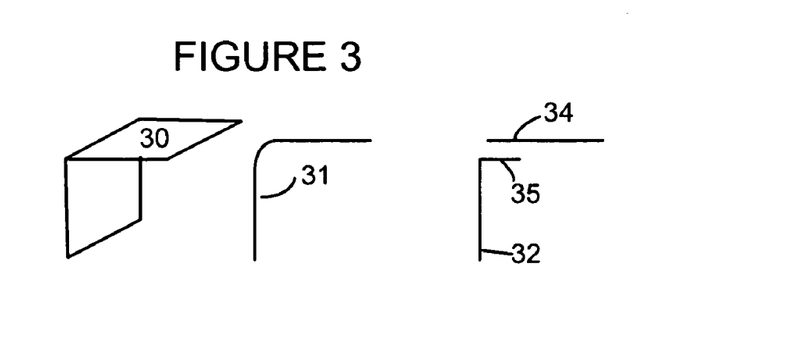
FIG. 3 shows two different ways to produce the same target part.

Referring to FIG. 3, it can be seen that a target part 30 could be manufactured in more than one way. For example, the target part 30 could be manufactured by bending a single piece of sheet metal 31. The target part 30 could also be constructed by welding one piece of sheet metal 32 to another piece of sheet metal 34. In this specific example, piece 32 includes an additional flange to enable welding to piece 34. Thus, it is clear that the manufacturing process can affect the sheet metal part geometry. In other words, a manufacturing process can cause the geometry to be modified.

Figure 4:
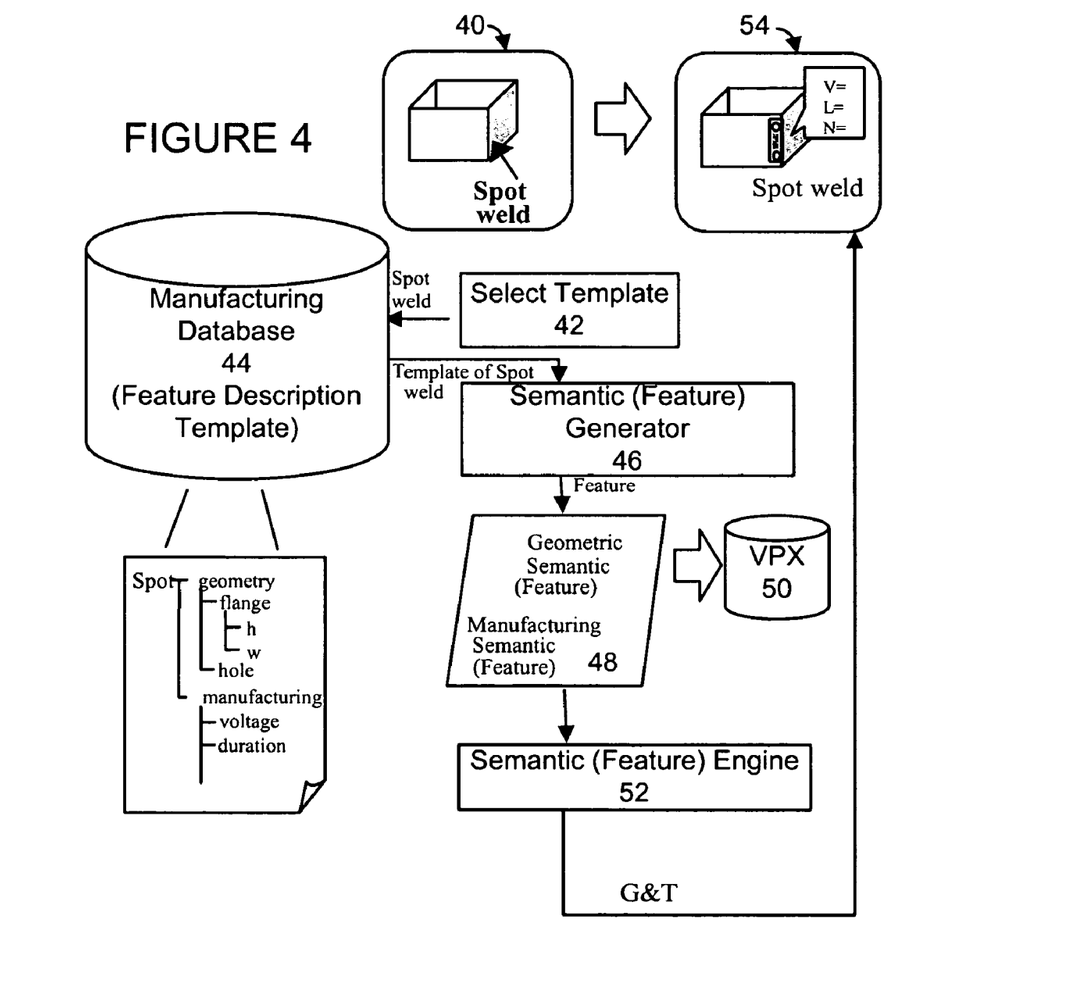
FIG. 4 shows a system for determining a flat layout design based upon a drawing of a target part, according to an aspect of the present invention.

Construction of a VPX file is now described with reference to FIG. 4. Initially, specification data 40 (e.g., a drawing of the target part) is input by the customer. Specification data typically describes the target part that will be manufactured. How the target part will actually be created, including the various manufacturing processes and the shape of the unfolded material (i.e., flat layout design) needs to be determined and stored in a VPX file.

Once the specification data is reviewed, the designer selects a manufacturing process and a corresponding location on the target part. The location can be either graphically or parametrically designated. In this example, the designer selects a spot weld. In one embodiment, a dialog box then appears on the screen requesting the designer to enter parameters based upon a template corresponding to the manufacturing process. The template is retrieved from a manufacturing database 44 at block 42, based upon the specified manufacturing process and the target part geometry. The various templates stored in the manufacturing database 44 enumerate parameters for different manufacturing processes. In the case of a spot weld, the template can include the geometry for the required additional flange (e.g., the height and width of the flange) and the required holes. Other parameters include the voltage of the weld, the duration of the weld, etc.

Block 46 represents calculation and/or input of the template parameters. Some of the values for the template fields are manually input by the designer. Other parameters are calculated by the system itself based upon prestored data and the part geometry. For example, the designer may indicate the number of holes, and based on the input number and the target part geometry, the system looks up the required geometry of the flange.

After all of the information has been input and calculated, the parametric data is stored in memory at block 48. This information includes all of the geometric feature data based upon the target part, as well as the manufacturing feature data.

Alternative manufacturing processes can be included in the VPX file. For example, the designer can view the target part and select another manufacturing process, e.g., a TIG weld. In the case when the designer specifies a TIG weld, a TIG weld template can be filled in by the designer/system. Similarly, a bend could be selected and appropriate bend data could be generated. Accordingly, multiple manufacturing processes can be associated with the target part. An advantage of having multiple manufacturing processes is that the machine operator can select which process to use and the appropriate flat layout design will already have been developed. For example, if the spot welding machine is busy or inoperable, the operator may elect to use a TIG welding machine without having to first design an appropriate flat layout design.

The manufacturing and geometry information is transferred from memory 48 and stored in a VPX file 50. A semantic (feature) engine 52 (i.e., feature interpretation engine) may be provided to create geometry and topology (G&T) so that a final model can be displayed along with the selected manufacturing process and associated parameters. In FIG. 4, a display 54 shows the sheet metal part needed to create the target part, i.e., the flat layout design (albeit folded in FIG. 4), based upon use of a spot weld. Thus, the extra flange and associated holes are part of the geometry and are displayed. In addition, other manufacturing parameters can be displayed, such as the voltage (V), length of time of weld (L), etc. If a different manufacturing process is selected, a different flat layout design can be seen for the target part.

Accordingly, because semantic data is processed and stored, rather than geometric data (i.e., the system is feature based), the present invention captures designer's intentions intuitively and quickly. Moreover, design and manufacturing changes are quick and flexible. The present invention also accumulates user manufacturing know how because all manufacturing information is stored in a single file system.

As mentioned above, the component sheet metal part VPX files store the geometry of the part, basically every flange in folded and/or unfolded form, along with the topology information describing how the flanges are connected. The component VPX files also store sophisticated features defined at the part level. In the sheet metal model, the connectivity information is represented by bend line features. The bend line features consist of simultaneous bend lines, namely, one or more collinear bend lines between two flanges. The component VPX file can store both 2D and 3D geometries, permitting the designer to specify manufacturing attributes in both 2D and 3D.

A sketch object represents the basic geometry of a flange or face of the part. The basic geometrical objects of the flange are: loops that contain geometrical elements such as lines, arcs, circles, ellipses, and nurbs. The first loop by index represents the outer boundary of the flange and the other loops will form holes or links inside the flange. The loops can be closed (holes) or open (links). The elements in the loop have constraints such as parallel, perpendicular, angular, tangential, concentric, and coincident. The constraints are user specified or automatically set for shapes that represent standard sheet metal shapes, such a notches, arc slots, standard polygons, etc. Thus, when the sketch is edited parametrically, the shapes can be retained and modified meaningfully in the intended way.

More of the sophisticated features that can be described by the VPX model will now be described. Operations carried out on the model to modify its shape to produce the desired design shape of a product can be edited easily to make design changes. Operations include trimming operations to modify 3D shapes, shape insertion operations to enter standard shapes on the flanges, and dimensioning operations to create dimension objects on the model to edit the shape of the part or during inspection to compare the dimension of the manufactured product with the model.

Trimming operations/features (i.e., sheet metal model edit features) are objects that represent user operations to modify the 3D assemblies and components to produce the target model quickly, and to produce derived or similar models by quickly changing the parameters of the object. Exemplary trim features include setback, overlap, flange trimming, flange offsetting, radius corner trimming, relief holes, relief slot features etc. For example, when a setback feature is applied, manufacturing attributes can be added. Welds are common with setback. How a customer wants to apply welds may affect the setback geometry/data.

Pattern features (i.e., shape insertion operations) represent standard shapes that can be manufactured by predefined tools or sets of tools, and the distribution pattern of placing the shapes on the part. Exemplary pattern features include standard sheet metal tool shapes such as single circle, square, rectangle, oblong, rectangle with round corners, single D, double D, burring, tap, special hole, forming hole, and marking tool. The pattern features also include the shape's placement distribution on the flange, such as an arc pattern or a grid pattern.

Dimension objects represent user operations to modify the 3D model, to create dimension objects, to display the dimension, to use the dimension as a value for parametrically editing the part shape, or to modify after assembly matching dimensions between parts. Dimensions created on the model can be used for inspecting the dimensions of the manufactured part and comparing the manufactured dimensions with the model dimensions during the assembly operation.

As noted above, assembly VPX files store attachment (i.e., assembly) feature data. Attachment features relate to matching more than one part when assembling parts to produce the final product. The process involved in the matching operation includes moving a part, namely, a source part, to match with the part which will remain stationary, namely, the destination part, in such a way that reference points/objects in the source part match correctly with the reference points/objects in the destination part with a given offset. Other part movement operations for assembling parts, such as flipping of parts, rotating the parts, the assembling order, and the information added in the assembly operations are also saved in the assembly VPX file.

Process attributes can be added on the features created by the matching operations. For example, process attributes for different types of welding processes, such as a resistance weld, a TIG weld, a $CO_2$ weld and a YAG weld could be added. Based on the type of weld process selected, surfaces or edges of the parts touching each other will be detected and formed as sub features, on which the weld attributes will be set. That is, because weld features are created for several touching edges of a part, attributes of the weld include the touching edges.

Positioning feature information is stored in the VPX assembly files. The position information is added on the model after confirming the positions graphically, and can include markings added on the flat layout using marking tools. These marks can be used for matching while assembling the manufactured parts in the shop. Exemplary types of positioning attributes include half shear plus bottom hole, laser marking, and center punching. The parameters for entry will vary according to the positioning type chosen.

CAD systems can interface with CAM systems. Thus, in an embodiment the VPX data can be used with any CAM system. One possible reason for sending the data to CAM systems is to verify the part design with respect to manufacturing feasibility. When the feasibility check fails, part design is changed, namely, the parts can be further decomposed in such a way that the part design and process feasibility can be verified thoroughly in the engineering design phase itself. The design iteration is carried out not only to verify the manufacturing feasibility, but also to evaluate different design alternatives to arrive at the optimal design. The manufacturing attribute information added in one system is used in the other system in validating the part design and to produce the process plan in that system. For example, joint information added by a CAM system can be used to choose the welding process in the CAD system. For example, the edges having joints can be avoided for matching or welding.

Figure 5:
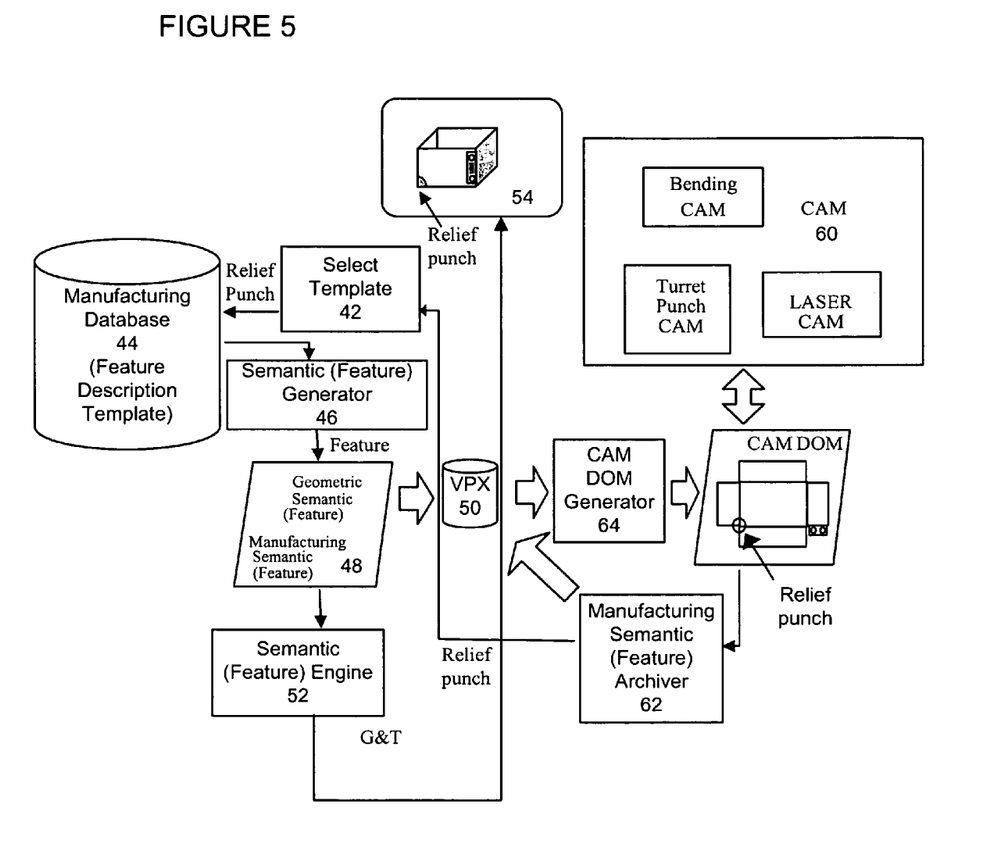
FIG. 5 illustrates feedback from a CAM customer reflected in the flat layout design, according to an aspect of the present invention.

Referring to FIG. 5, adding a new feature by the CAM customer will be described. Upon reviewing the data, the CAM customer may realize a modification is required. In this example, the CAM customer perceives the need for a relief hole after processing the data with CAM software 60, such as Bending CAM software, Turret Punch CAM software, or Laser CAM software. Once the relief punch is specified, a manufacturing feature archiver 62 processes the data, in part by detecting the part entity that is being affected and storing the feature into the VPX file 50. If the new item is independent from the original file, then it is added directly to the file. If the new feature (e.g., relief punch) affects a current feature, then a relief punch template is retrieved from the manufacturing database 44. The process for creating the relief punch data for the VPX file and displaying the layout proceeds as described above with respect to FIG. 4. Finally, the display 54 shows the part with the relief punch at the appropriate location.

Conversion of data for use with CAM software is now described. In a preferred embodiment, the VPX file is converted to a document object model (DOM) format whenever a CAM system requests the VPX data. Any changes due to the conversion are noted in the VPX file. In one embodiment, collinear lines are merged into a single line during the conversion. Because the changes are noted in the VPX file, when the CAM customer adds a manufacturing feature (e.g., a relief hole) the original VPX model is properly updated. For example, if two lines A and B are merged into a single new line C, and the CAM customer modifies line C, the VPX file is aware that line C originated from lines A and B and can thus associate the new feature with line A or B, depending on the exact location of the new feature.

In an embodiment of the present invention, the VPX files store not only current active features, but also a history of the features. That is, the order in which the features are constructed is stored in the VPX file. Thus, there are two ways to update the file: developing a new configuration, and restoring an older configuration. When reading the VPX file, all configuration data will be read, but, only one specified configuration will be active.

Figure 6:
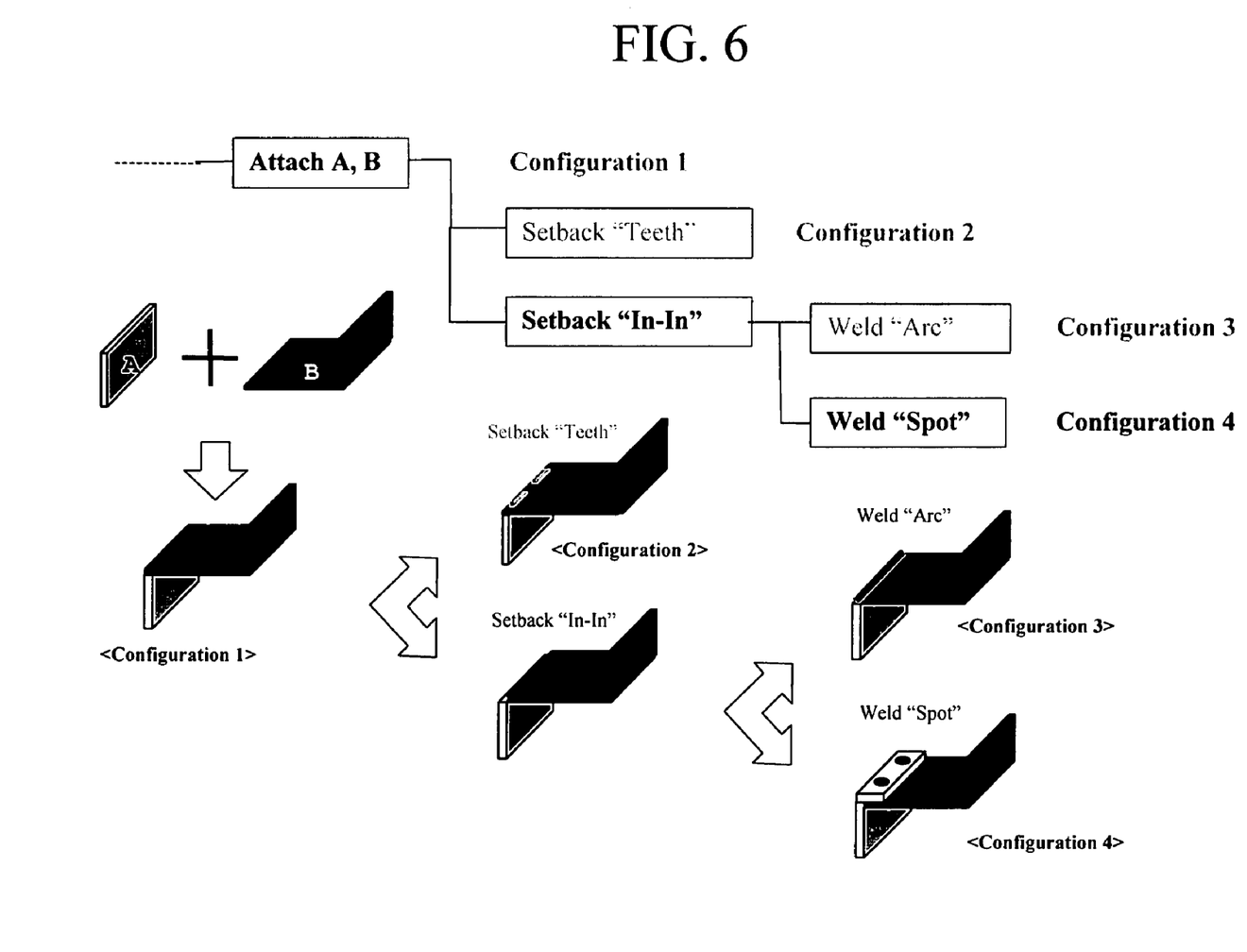
FIG. 6 illustrates a configuration history, according to an aspect of the present invention.
Figure 7:
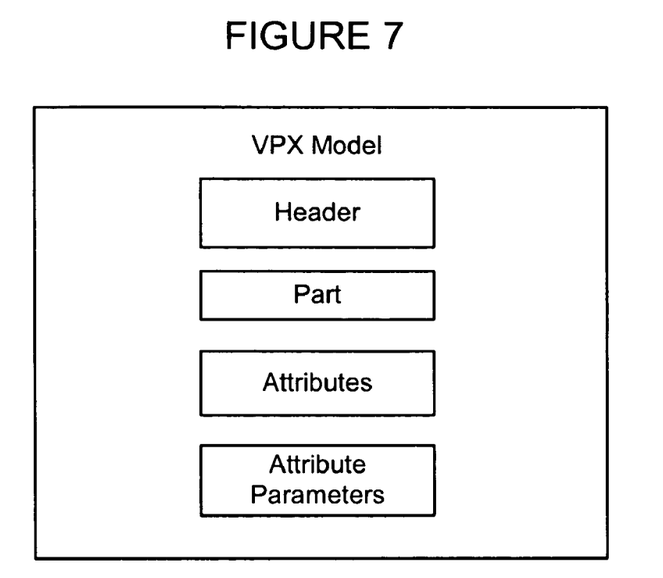
FIG. 7 shows a VPX model structure, according to an aspect of the present invention.

Referring to FIG. 6, multiple configurations will now be described. In the example shown in FIG. 6, a user attached two parts: A and B. The attachment is referred to as configuration 1. Next, the user added a setback feature, in particular a teeth setback, creating configuration 2. Subsequently, the user decided instead to use an in-in setback and an arc weld. This is configuration 3. When the user changed the arc weld to a spot weld, a fourth configuration was created.

Rather than recreating all of the data for each configuration, data from an old configuration can be used. In FIG. 6, the features shown in bold are part of the current configuration (i.e., configuration 4). Thus, the attachment, in-in setback, and spot weld define configuration 4.

As noted above, the VPX file system is an object based file system containing assembly information, part information, feature information, process information, and attributes. The file representing assembly information, and the features defined at the assembly level are present in assembly VPX files. Part information and features defined at the part level are present in part VPX files.

An exemplary format will now be described with respect to FIGS. 7-10. A VPX model file contains a header, a part object, attributes, and attribute parameters. The header can include the filename, for example. Because the VPX model can have multiple parts, and can have attributes common to more than one part, some attributes are available in the VPX model. That is, some attributes, which are owned by entities in more than one part, are available in the VPX model. The attributes, part objects, and attribute parameters will be described in more detail below.

Figure 8:
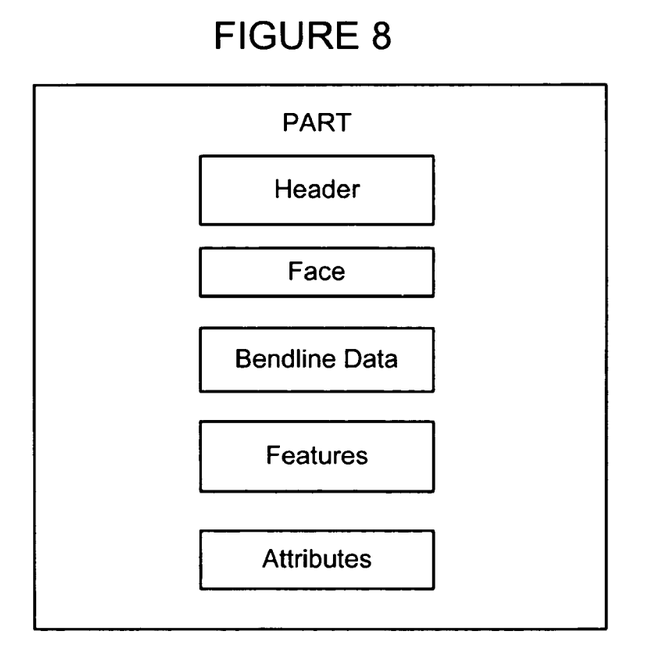
FIG. 8 shows a part object structure, according to an aspect of the present invention.

As seen in FIG. 8, a part includes a header, a face, bend line data, and features. The header can include information such as the thickness of the material and the material type. The face information includes the geometric data describing each face of the part, as well as the name of bend lines associated with the face. The bend line data includes information describing each bend line of the part. Exemplary information includes the type of bend, attachment information, the bend type (i.e., manufacturing information), the number of bends, the V width, the coordinates of the center line, the tools used to create the bend, and whether the bend line is collinear and/or simultaneous with another bend line. Feature information, as described above, and attribute information are also included in the part data. The attribute data stored in the part objects refers to entities inside a part that are only available inside that part.

Figure 9:
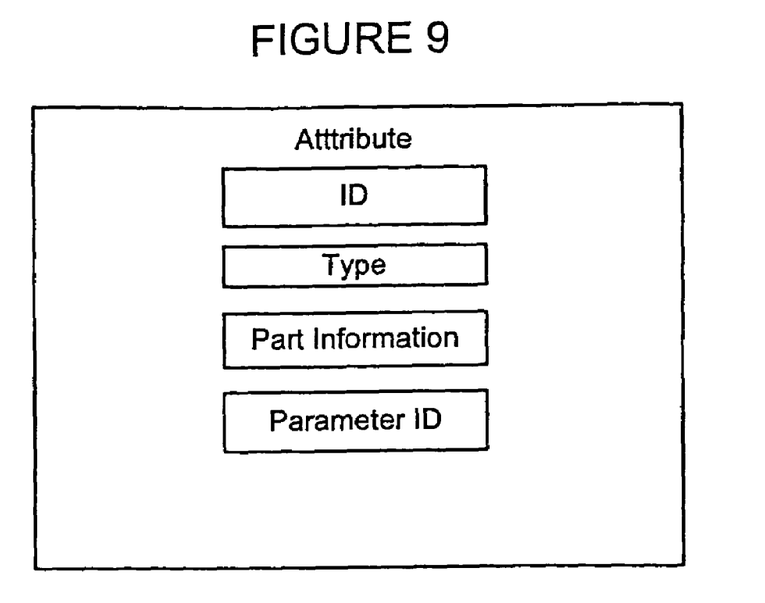
FIG. 9 shows an attribute structure, according to an aspect of the present invention.
Figure 10:
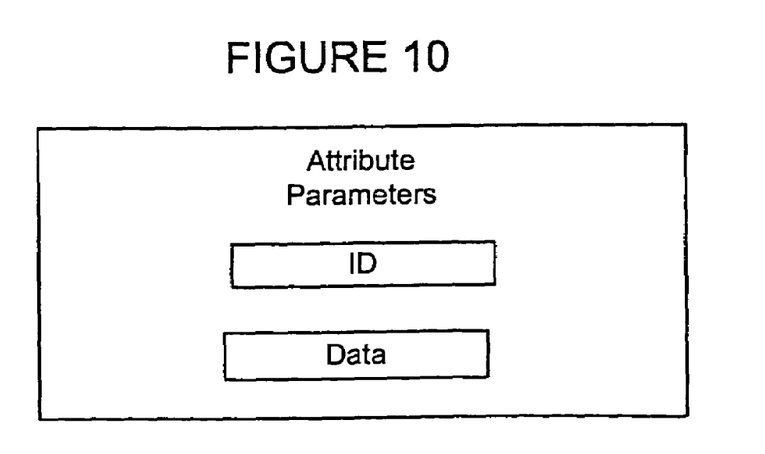
FIG. 10 shows an attribute parameter structure, according to an aspect of the present invention.

Attributes are usually manufacturing attributes related to the part or geometrical entities belonging to the part. Attributes can be attached to any part. As seen in FIG. 9, each attribute has an ID and information about the part to which it is attached. Attributes also have a type. Each attribute type has its own definition and data called attribute parameters. Accordingly, the attribute definition and the data structure are flexible, and are specific to the applications that store and read the attribute. As seen in FIG. 10, the attribute parameter includes an identifier (to which the attribute refers) and the data specific to the attribute type. For example, in the case of a laser cut the data should indicate which face is being cut and the location of a pierce point. In the case of a TIG weld, the number of welds, the position, the type of TIG weld, etc. should be included.

In an aspect of the present invention, a collaboration function is provided. In this embodiment, feature data is copied to each machine that will be collaborating. For example, a user at an office and a user on a shop floor may wish to collaborate. In this case, a machine in the office (e.g., a PC) and a machine on the shop floor (e.g., a PC-based controller) both load the feature data for the part. Each machine should have a semantic (feature) engine. Thus, each machine will be able to generate geometry and topology information based upon the feature data. Because the semantic (feature) engine at each site generates the geometry and topology data, the engine at both sites should be the same version to ensure that the same data is generated. If one of the collaborators wishes to modify the part, the collaborator specifies the change, and appropriate parameters are input (or generated) as described above. The new process and parameters are forwarded to the other collaborator(s). Thus, by sharing feature information, the part geometry can also be shared. Although the example discussed sharing between an office and a shop floor, the data can also be shared via the Internet amongst a variety of work stations.

Advantages of the collaboration embodiment include reduction of the network traffic. Moreover, the collaboration ability intuitively and directly transfers manufacturing information to the shop floor, as well as makes communications more intuitive and quick.

The VPX file of the present invention conveys processing instructions to shop floor operators. In the new VPX file system, process attributes are stored on the model at the appropriate location so that processing instructions are conveyed visually and more accurately to the shop floor operators.

Thus, the present invention provides a complete model of a part, including several flat layout designs and several ways to produce the part. Because all of the information is stored together, management time is reduced. When a complete model is retrieved, all of the information is readily available and the operator can select the process (e.g., welding if the bending machine is not operating). When a final product is modified all other data can be easily adjusted. That is, the manufacturing and geometry data can be adjusted without requiring the operator's input.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. For example, the VPX file can store additional information, such as bend sequencing, etc. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards represent examples of the state of the art. Such standards are periodically superseded by faster or more efficient equivalents having essentially the same functions. Accordingly, replacement standards and protocols having the same functions are considered equivalents.

What is claimed is:

1. A system for constructing a 3D sheet metal part data file, comprising:
   a template selector that selects a template based upon a manufacturing process selected by a user when reviewing specification data;
   a manufacturing database that stores templates that can be selected by the template selector, the templates enumerating parameters for a plurality of manufacturing processes;
   a semantic feature generator that calculates template parameters and receives template parameters input by the user;
   a memory that stores geometric feature data of a 3D sheet metal part and manufacturing data of the 3D sheet metal part, the geometric feature data and the manufacturing data being based upon input parameters, calculated parameters, and specification data, and the geometric feature data being based upon the manufacturing data, such that the geometric feature data is changed when the manufacturing data is changed,
   a manufacturing feature archiver configured to process manufacturing data input by the user, to detect the 3D sheet metal part that corresponds to the manufacturing data, and to store the geometric feature data in the memory,
   wherein a 3D sheet metal part data file is constructed, the 3D sheet metal part data file comprising the geometric feature data of the 3D sheet metal part and the manufacturing data of the 3D sheet metal part.

2. The system of claim 1, further comprising a semantic feature engine that creates geometry and topology information based upon the stored geometric feature data and manufacturing data, the geometry and topology data enabling display of a final model representing a flat layout design necessary to manufacture the 3D sheet metal part described by the specification data.

3. The system of claim 2, further comprising a manufacturing semantic feature archiver that processes user data reflecting a new feature added by a computer-aided manufacturing (CAM) user, the processing comprising storing feature data, based upon the user data, in the memory to update the geometric feature data and the manufacturing data.

4. The system of claim 1, further comprising a CAM document object model (DOM) generator that converts the geometric feature data and manufacturing data to a format for use with a CAM system in response to a CAM system requesting the feature data and manufacturing data.

* * * * *